US011855777B1

(12) United States Patent
Jia et al.

(10) Patent No.: US 11,855,777 B1
(45) Date of Patent: Dec. 26, 2023

(54) CHANNEL PUNCTURING BASED ON CHANNEL QUALITIES

(71) Applicant: Hewlett Packard Enterprise Development LP, Spring, TX (US)

(72) Inventors: Xuguang Jia, Beijing (CN); Jianpo Han, Beijing (CN); Qiang Zhou, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/823,172

(22) Filed: Aug. 30, 2022

(51) Int. Cl.
  *H04L 1/00* (2006.01)
(52) U.S. Cl.
  CPC .................................. *H04L 1/0068* (2013.01)
(58) Field of Classification Search
  CPC .................................................... H04L 1/0068
  See application file for complete search history.

(56) References Cited

U.S. PATENT DOCUMENTS

| 8,184,524 B2 | 5/2012 | Maltsev et al. |
| 2020/0287660 A1* | 9/2020 | Suh ........................ H04L 1/0059 |
| 2021/0281360 A1 | 9/2021 | Xu et al. |

OTHER PUBLICATIONS

Li et al., "Optimal Puncturing of Polar Codes With a Fixed Information Set", Mar. 15, 2019, 7 pages.
MATLAB & Simulink, "802.11be Waveform Generation", May 26, 2022, 20 pages.

* cited by examiner

*Primary Examiner* — Thien Nguyen
(74) *Attorney, Agent, or Firm* — Hewlett Packard Enterprise Patent Department

(57) ABSTRACT

In embodiments of the present disclosure, there is provided an approach for selecting a channel puncturing scheme based on channel qualities. A method comprises detecting channel interference between neighbor access points (APs), and determining whether a preamble puncturing needs to be enabled based on some puncturing conditions. After determining that a preamble puncturing needs to be enabled, scores for candidate puncturing patterns are calculated based on channel qualities of the sub-channels in the channel, and a proper puncturing pattern can be selected based on the respective scores. Embodiments of the present disclosure can help AP to achieve an effective and better puncturing scheme in real deployment.

20 Claims, 10 Drawing Sheets

CHANNEL PUNCTURING BASED ON CHANNEL QUALITIES

BACKGROUND

Preamble puncturing is an optional feature introduced in Institute of Electrical and Electronics Engineers (IEEE) 802.11ax (Wi-Fi 6), and is more flexible and effective in 802.11be (Wi-Fi 7). The preamble puncturing refers to a transmission of a physical layer protocol data unit (PPDU) in which no signal is present in at least one 20 MHz sub-channel within the PPDU bandwidth. The preamble puncturing supports various types of transmissions, such as single user (SU), multi-user orthogonal frequency division multiple access (MU-OFDMA), multi-user multiple-input and multiple-out (MU-MIMO), and the primary 20 MHz channel may be zeroed out.

Wi-Fi introduces the 320 MHz bandwidth and multi-link operation in IEEE 802.11be, but channel band resources may be limited in different regions. For example, in some regions, only one contiguous 320 MHz channel is provided in 6G band unlicensed national information infrastructure (UNII-5), and bandwidth crossing issue may exist in the inter-basis service set (BSS) or extern-BSS (OBSS). By enlarging the bandwidth of the channel, the channel availability can be increased and better user experience can be provided.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
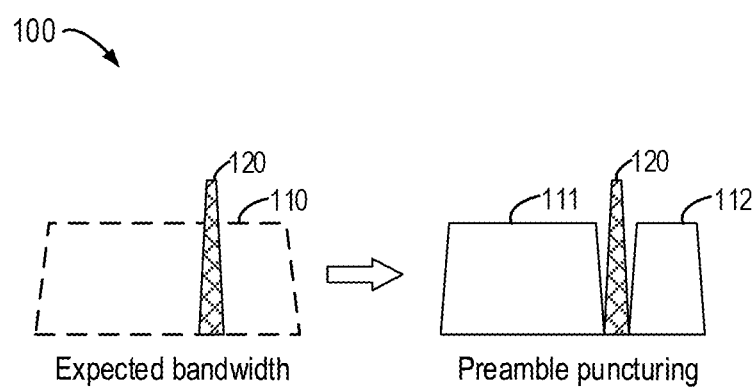
FIG. 1 illustrates an example of the preamble puncturing in case of a channel interference.

As discussed above, the preamble puncturing is powerful and useful, and is more flexible and effective in IEEE 802.11be (Wi-Fi 7). However, the specification of IEEE 802.11be does not define how to use the puncturing patterns in real deployment. The preamble puncturing introduces a flexible and effective way to organize the channel. However, in some cases, the preamble puncturing may bring about some downsides if it is used in an improper way, which may make the wireless local area network (WLAN) worse.

Traditional puncturing schemes have some problems. First, traditional puncturing schemes do not consider whether the preamble puncturing is needed. In some cases, it is not necessary to implement the puncturing scheme. For example, if the overall channel utilization is very low or the neighbor AP with the overlapped channel is inactive, there may be no benefit from a fixed puncturing scheme applied to one or both channel-overlapped APs, because low channel utilization rarely causes conflict and puncturing scheme causes additional cost due to less bandwidth. For another example, if BSS coloring is enabled for both neighbor APs with the overlapped channel and received signal strength indication (RSSI) of a frame or most frames from neighbor BSS is less than a threshold, there is no need to implement preamble puncturing because BSS coloring already considers this case and additional cost may be added. Second, there is no good way to select a proper puncturing pattern in traditional puncturing schemes, and the improper puncturing pattern may cause inefficient channel access. For example, if too litter multiple resource unit (MRU) is zeroed out, one AP may have to wait for completion of transmission of another AP, which will cost more time for transmissions. For another example, if too much MRU is zeroed out, it will waste more frequency resources.

Therefore, embodiments of the present disclosure propose a scheme for managing the puncturing solution of an AP, including providing criteria on whether to enable the preamble puncturing and guidelines on how to select a suitable puncturing pattern. Embodiments of the present disclosure can help AP to achieve an effective and better puncturing solution in real deployment. Meantime, for real-time preamble puncturing, it may cause pressure on hardware design and central processing unit (CPU) performance which may lead to high latency for traffic scheduling. To better leverage the preamble puncturing feature, the present disclosure provides an effective way to select the suitable puncturing pattern.

According to embodiments of the present disclosure, after the interference is detected in a channel between neighbor APs, whether a preamble puncturing is needed is determined based on puncturing conditions. Then, scores for possible puncturing patterns are calculated based on channel qualities, and then a proper puncturing pattern can be selected based on the respective scores. Thus, embodiments of the present disclosure can provide some puncturing conditions for determining whether to enable a preamble puncturing and provide some guidelines on how to select a proper puncturing patter, and thus can reduce the adjacent band interference issue for Wi-Fi.

Other advantages of embodiments of the present disclosure will be described with reference to the example implementation as described below. Reference is made below to FIG. 1 through FIG. 8 to illustrate basic principles and several example embodiments of the present disclosure herein.

FIG. 1 illustrates an example of the preamble puncturing in case of channel interference. As shown in FIG. 1, in the environment 100, there is channel interference 120 in the expected bandwidth 110, such as an overlapped channel by neighbor APs, and thus it cannot utilize the whole of the expected bandwidth 110. Radios are capable of using a dynamic bandwidth operation where an AP can change the channel-width on a per frame basis.

In FIG. 1, according to the preamble puncturing scheme, both the bandwidth 111 and the bandwidth 112 in the expected bandwidth 110 may be used together for transmissions, rather than only the bandwidth 111. For example, the expected bandwidth 110 is 80 MHz, the bandwidth 111 is 40 MHz and the bandwidth 112 is 20 MHz, and 60 MHz can be utilized for channel transmissions rather than only 40 MHz. Thus, by use of the preamble puncturing scheme, more bandwidth resources can be utilized.

Figure 2A:
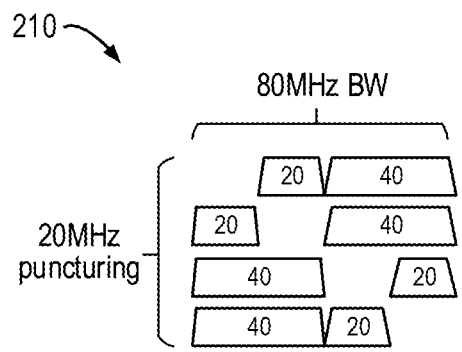
FIGS. 2A-2D illustrate various puncturing patterns for different bandwidths.
Figure 2B:
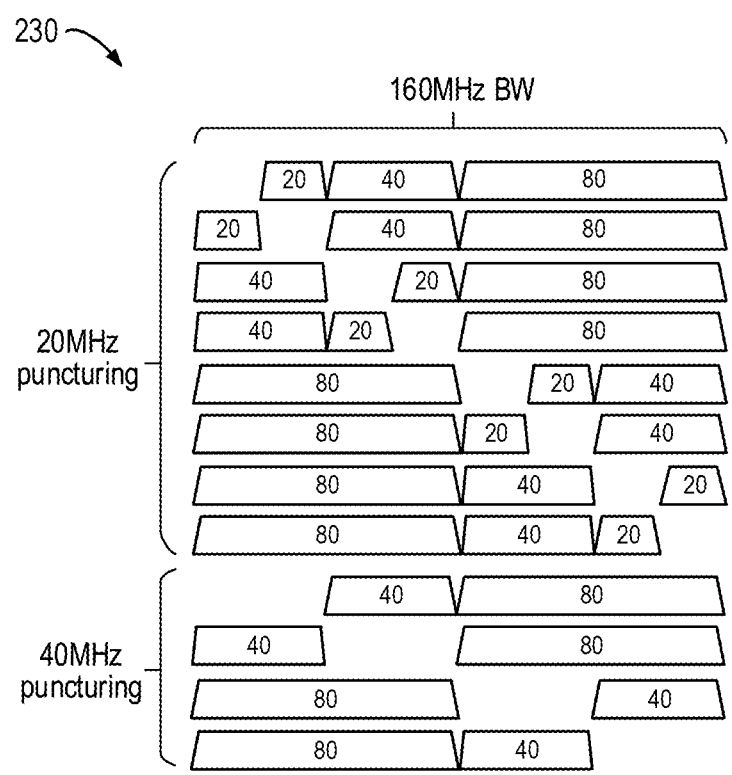
Figure 2C:
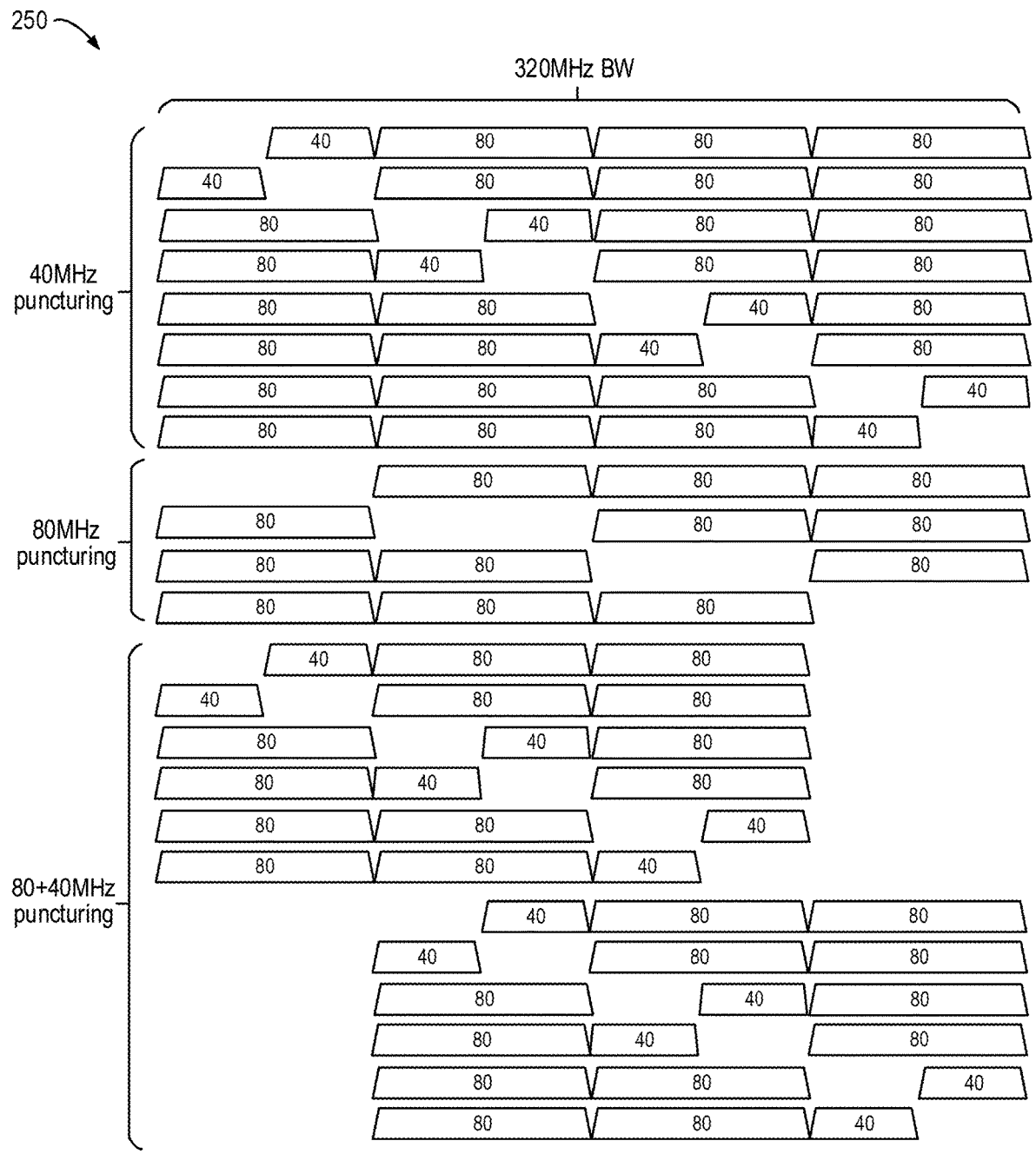
Figure 2D:
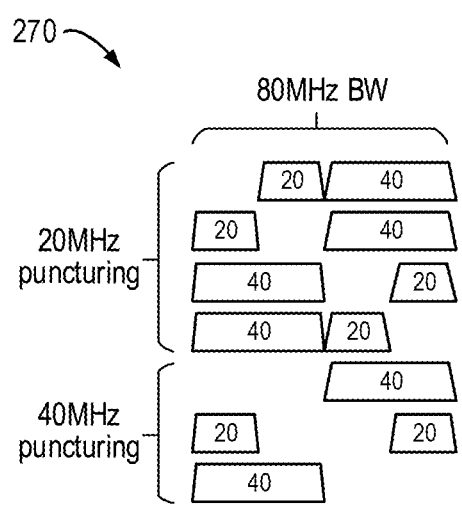

FIGS. 2A-2D illustrate various puncturing patterns for different bandwidths. MRUs are the subcarriers that are used for puncturing the resource allocation in the operating channel, and the puncturing granularity is 20 MHz. FIGS. 2A-2C illustrate puncturing patterns for non-OFDMA case, while FIG. 2D illustrates puncturing patterns for non-OFDMA case.

OFDMA is a technology introduced in Wi-Fi 6, and it improves wireless network performance by establishing independently modulating subcarriers within frequencies. OFDMA allows simultaneous transmissions to and from multiple clients, and it is a type of OFDM for multiple users. OFDMA allocates in both the time domain and the frequency domain, and can provide higher diversity and efficiency of frequency and lower interference.

FIG. 2A illustrates puncturing patterns for non-OFDMA case of 80 MHz bandwidth (BW). In the scenario 210, there are four puncturing patterns with the puncturing granularity of 20 MHz. For example, 242-tone MRUs may be punctured in the 80 MHz bandwidth.

FIG. 2B illustrates puncturing patterns for non-OFDMA case of 160 MHz bandwidth. In the scenario 230, there are eight puncturing patterns with the puncturing granularity of 20 MHz and four puncturing patterns with the puncturing granularity of 40 MHz. For example, 242-tone MRUs or 484-tone MRUs may be punctured in the 160 MHz bandwidth.

FIG. 2C illustrates puncturing patterns for non-OFDMA case of 320 MHz bandwidth. In the scenario 250, there are eight puncturing patterns with the puncturing granularity of 40 MHz, four puncturing patterns with the puncturing granularity of 80 MHz, and six puncturing patterns with the puncturing granularity of 80+40 MHz. For example, 484-tone MRUs, 996-tone MRUs, or 1480-tone MRUs may be punctured in the 320 MHz bandwidth.

FIG. 2D illustrates puncturing patterns for OFDMA case of 80 MHz bandwidth. In the scenario 270, there are four puncturing patterns with the puncturing granularity of 20 MHz and three puncturing patterns with the puncturing granularity of 40 MHz. For example, 242-tone MRUs or 484-tone MRUs may be punctured in the 80 MHz bandwidth. As shown in FIG. 2D, there are total seven puncturing patterns for each 80 MHz bandwidth, and there will be 72 possible puncturing patterns for 160 MHz bandwidth and $7^4$ possible puncturing patterns for 320 MHz bandwidth.

Figure 3:
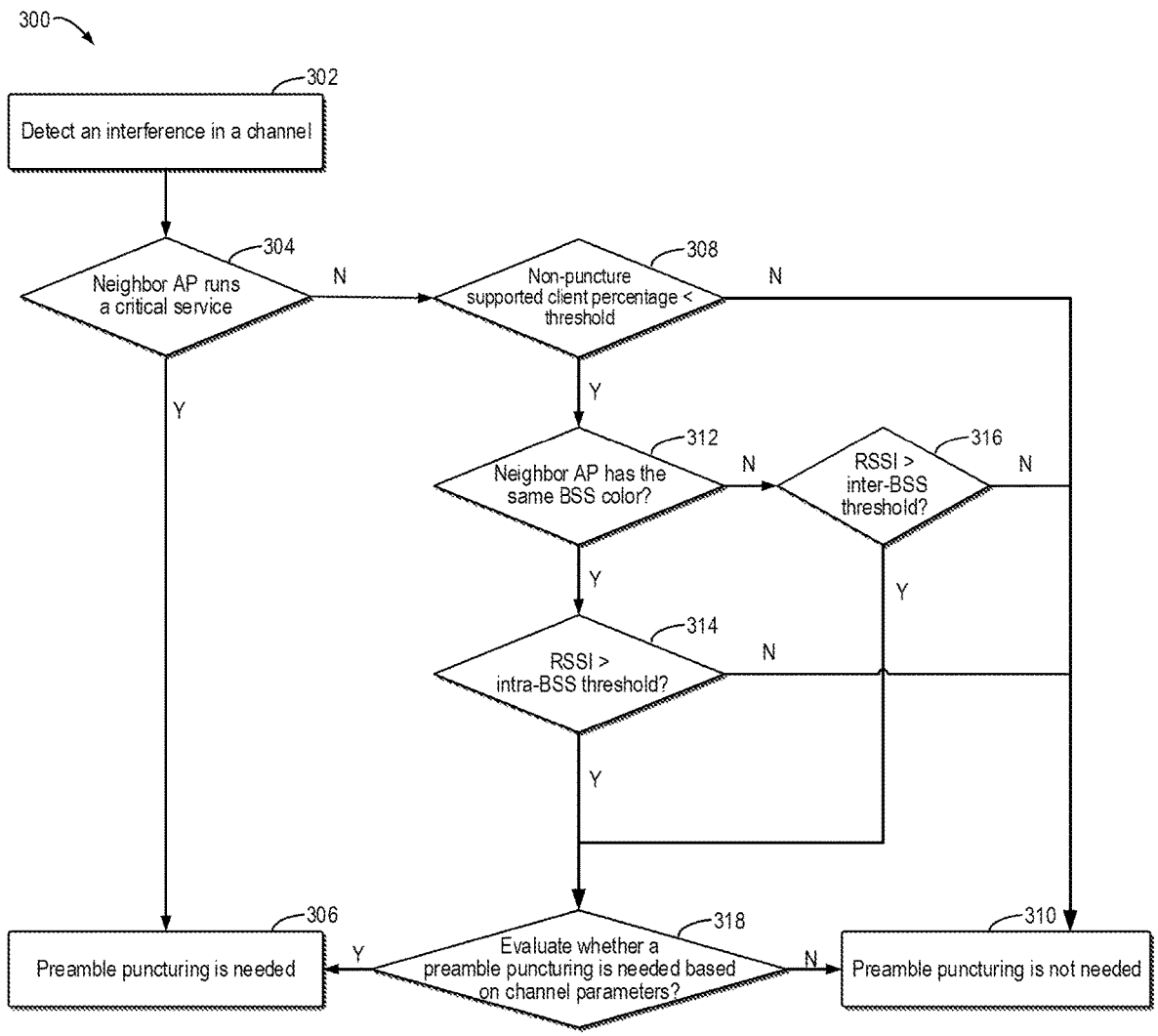
FIG. 3 illustrates a flow chart of an example method for determining whether a preamble puncturing is needed according to embodiments of the present disclosure.

FIG. 3 illustrates a flow chart of an example method 300 for determining whether the preamble puncturing is needed according to embodiments of the present disclosure. The method 300 may be performed by an AP for determining whether to do the preamble puncturing based on the statuses of neighbor AP(s).

At 302, the interference between two or more neighbor APs is detected in a channel, and then the method 300 proceeds to determine whether a preamble puncturing needs to be enabled on the channel based on one or more puncturing conditions according to embodiments of the present disclosure.

At 304, the method 300 determines whether the neighbor AP runs a critical service. Alternatively, the method 300 may determine whether neighbor AP runs a critical service and whether critical service back off policy is enabled. If the method 300 determines that the neighbor AP runs a critical service at 304, then the method 300 proceeds to 306 and determines that the preamble puncturing needs to be enabled on the channel so as to not disturb the critical service of the neighbor AP.

In some deployments, it needs to avoid transmission on specific frequency that may be locally unauthorized by regulations, such as dynamic frequency selection (DFS) in 5 GHz and 6 GHz frequencies, because the specific frequency may be used for other non-Wi-Fi devices. Even 6 GHz radio has automatic frequency control (AFC), such as the limit transmit power or channel assignment, the AP still needs to concern the real air frequency conditions. In some embodiments, in existing national security and emergency preparedness (NSEP) communication services, the priority access is considered. For example, if action frames or broadcast management frames with NSEP enhanced defense cooperation agreement (EDCA) parameters is detected, preamble puncturing is needed so as to reduce the congestion.

If the method 300 determines that the neighbor AP does not run a critical service at 304, the method proceeds to 308 and determines whether the non-puncture supported client percentage is less than a predetermined threshold. If the method 300 determines that the non-puncture supported client percentage is not less than a predetermined threshold at 308, the method proceeds to 310 and determines that the preamble puncturing is not needed in the channel. Non-puncture supported clients need to use fixed first primary 20 MHz channel, and they may fail to decode the punctured packets and may treat as channel busy. In some embodiments, if non-puncture supported client percentage is greater than a specific threshold value such as 30%, there is no need to do preamble puncturing.

If the method 300 determines that the non-puncture client percentage is less than a predetermined threshold at 308, the method proceeds to 312 and determines whether the neighbor AP has the same BSS color with the current AP. If the method 300 determines that the neighbor AP has the same BSS color with the current AP at 312, the method 300 proceeds to 314 where frames from the neighbor AP are categorized as intra-BSS traffic; otherwise, the method 300 proceeds to 316 where frames from the neighbor AP are categorized as inter-BSS traffic.

The BSS color, also known as BSS coloring, is a method for identifying overlapping basic service sets (OBSSs). The BSS color is a numerical identifier of the BSS and is the coexistence bit in preamble. The radios are able to differentiate between BSSs using BSS color identifier when other radios transmit on the same channel. If the detected frame has a same BSS color, this is considered to be an intra-BSS frame transmission, which means the transmitting radio belongs to the same BSS as the receiving radio. If the detected frame has a different BSS color from its own, it considers that frame as an inter-BSS frame from an overlapping BSS.

If the BSS color value of the received packet matches current BSS color setting, the packet will be regarded as intra-BSS traffic. If the BSS color value of the received packet does not match current BSS color setting, the packet will be regarded as inter-BSS traffic. In some embodiments, different clear channel assessment (CCA) thresholds may be applied to the intra-BSS traffic and inter-BSS traffic.

At 314, the method 300 determines whether the RSSI of the neighbor AP is greater than an intra-BSS threshold. If the method 300 determines that the RSSI of most packets of the neighbor AP is not greater than an intra-BSS threshold at 314, the method proceeds to 310 and ignores most frames from the neighbor AP, and determines that the preamble puncturing is not needed on the channel. Otherwise, the method proceeds to 318 and further evaluates whether a preamble puncturing is needed based on some channel parameters. In some embodiments, the channel parameters may comprise two or more of a channel utilization, a noise floor value, a retry rate, non-puncture client number and a physical error and other parameters.

At 316, the method 300 determines whether the RSSI of the neighbor AP is greater than an inter-BSS threshold. If the method 300 determines that the RSSI of most packets of the neighbor AP is not greater than an inter-BSS threshold at 316, the method proceeds to 310 and ignores most frames from the neighbor AP, and determines that the preamble puncturing is not needed on the channel. Otherwise, the method proceeds to 318 and further evaluates whether a preamble puncturing is needed based on some channel parameters.

At 318, the method 300 further evaluates whether a preamble puncturing is needed based on some channel parameters, and decides to finally proceed to 306 or 310. In some embodiments, channel parameters of the neighbor APs may be monitored or analyzed, and the channel parameters include, but not limited to, BSS channel utilization, RSSI, noise floor (NF), transmit retry (TX retry), CRC/PHY error and so forth. For example, the channel utilization may be calculated by the transmit time and receive time of self or neighbor BSS traffic by the following equation (1). Higher channel utilization means worse air condition.

$$\text{Channel utilization} = Rx \text{ Time percentage} + Tx \text{ Time percentage} \quad (1)$$

where Rx Time percentage denotes a time percentage of receiving in the channel, and Tx Time percentage denotes a time percentage of transmitting in the channel.

NF is the noise floor value, and is used to calculate current signal noise ratio (SNR) with signal strength. TX retry is the flag bit in the frame control field, which means not getting acknowledgement (ACK) from the receiver, and thus the receiver may fail to decode the TX packets or fails to hear. The CRC/PHY error indicates that receive (RX) signal is detected but fails to be decoded in PHY or MAC level, and packets transmitter may have lower TX power or too much noise signal in around envelope.

The channel parameters may be used to monitor Wi-Fi network quality and indicate any interface in the channel. For one example, if the overall channel utilization for 80 MHz is low, SNR from station is good, but PHY error is high, then it means there is active radio frequency interference presented in the sub-channel and thus preamble puncturing is needed in the channel. For another example, channel utilization of every 20/40/80/160/320 MHz band may be scanned, and if the channel utilization of any sub-band in the BSS operation channel is constantly high, then it needs to apply a puncturing scheme for this case. It is to be understood, although some examples of evaluating whether a preamble puncturing is needed are described, embodiments of the present disclosure may use other methods to evaluate whether a preamble puncturing is needed based on the channel parameters.

If the method 300 finally proceeds to 310, no action of preamble puncturing is required, or the preamble puncturing will be disabled. If the method 300 finally proceeds to 306, it means that the preamble puncturing needs to be enabled, and channel qualities of a plurality of sub-channels in the channel are obtained so as to select a proper puncturing pattern from a plurality of candidate puncturing patterns corresponding to the bandwidth of the channel. It is to be understood that although some puncturing conditions are described in FIG. 3, more or less puncturing conditions may be used to combine with embodiments of the present disclosure.

Figure 4A:
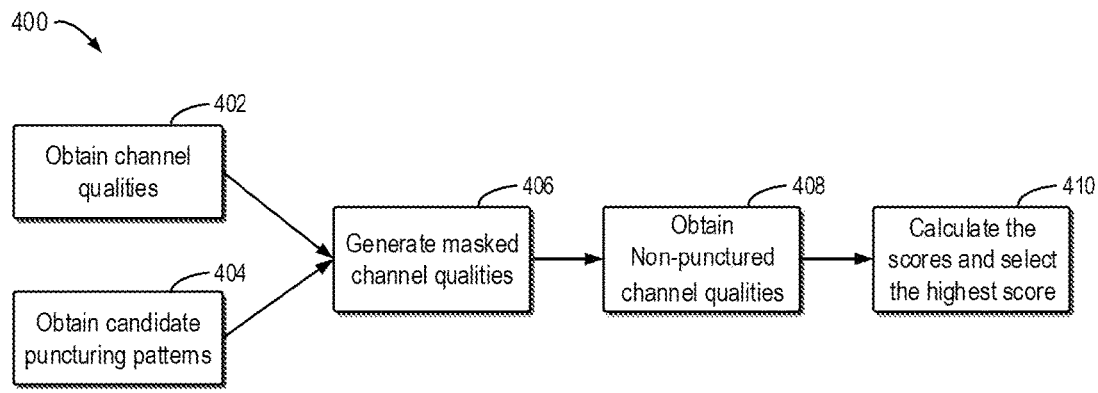
FIGS. 4A-4B illustrate a guideline for selecting a puncturing pattern according to embodiments of the present disclosure.

After the method 300 determines that the preamble puncturing is needed to be enabled, a proper puncturing pattern needs to be selected. FIG. 4A illustrates a process 400 for selecting a puncturing pattern according to embodiments of the present disclosure. At 402, channel qualities of sub-channels in the channel are obtained. For example, the channel qualities of the plurality of sub-channels may be determined based on some channel parameters associated with the channel, and the channel parameters may comprise two or more of channel utilization, physical errors, puncture/non-puncture wireless device number, traffic amount and so forth. In some embodiments, channel quality of each sub-channel may be calculated by a function F of the channel parameters according to the equation (2).

$$Q_i = F(\text{channel\_utilization}, \text{physical\_errors}, \ldots) \quad (2)$$

where i denotes the index of the sub-channel, the bandwidth of sub-channel may be 20/40/80/40+80 MHz, and $Q_i$ may be used in terms of percentage value, which belongs to [0, 100].

The channel quality of 20 MHz sub-channel is represented by Q20, the channel quality of 40 MHz sub-channel is represented by Q40, and the channel quality of 80 MHz sub-channel is represented by Q80. For 80 MHz channel bandwidth, it will have Q20 vector or array. For 160 MHz channel bandwidth, it will have Q20 and Q40 vectors or arrays.

The channel quality value Q20 may be obtained via 20 MHz channel band scanning according to equation (2), and the channel quality values Q40, Q80, and Q40+80 may be obtained via 40/80/40+80 MHz channel band scanning according to equation (2). Alternatively, some algorithms may be used to determine the channel quality values Q40, Q80, and Q40+80 based on the channel quality values Q20. For example, the channel quality value Q40 may be determined according to a minimum algorithm, such as a minimum value of the lower Q20 and the higher Q20.

The channel quality of the whole channel m for AP x may be represented by a vector or array of $Q_i$ the equation (3).

$$Q_{(AP_x, \text{channel}\_m)} = (Q_0, Q_1, \ldots, Q_n) \quad (3)$$

where n denotes the number of sub-channels in the channel.

In one example, if the channel bandwidth is 320 MHz, then n is 15. The $Q_i$ vector may be updated within a certain period of time. For example, since traffic changes in a millisecond scale, the function F has some traffic dependent statistics as input parameters, so the update timescale of quality $Q_i$ vector may be in a second scale. In some embodiments, forward sorting algorithm may be used to sort channel quality $Q_i$, and the worst quality may be obtained at the first position of the sorted array. It is to be understood that various ways of determining channel quality of each sub-channel may be used to combine with embodiments of the present disclosure.

At 404, candidate puncturing patterns for the channel are obtained according to a bandwidth of the channel. In non-OFDMA case, for 80 MHz channel, 20 MHz preamble puncturing may be used as shown in FIG. 2A; for 160 MHz channel, 20 MHz or 40 MHz preamble puncturing may be used as shown in FIG. 2B; for 320 MHz channel, 40 MHz, 80 MHz, or 40+80 MHz preamble puncturing may be used as shown in FIG. 2C. In OFDMA case, the channel may be split into 80 MHz unit, and each 80 MHz unit is processed independently. The above FIG. 2D illustrates candidate puncturing patterns for non-OFDMA case.

At 406, masked channel qualities are generated based on the determined channel qualities of the plurality of sub-channels and the candidate puncturing patterns. For example, the element of the sub-channel to be punctured is masked to be zero. At 408, non-punctured channel qualities are obtained by performing a minimum function to the masked channel qualities. For example, in each line, the values except zero are adjusted to be the minimum value of all non-zero values in the line. At 410, scores for the candidate puncturing patterns are calculated based on the non-punctured channel qualities, and a puncturing pattern with the highest score is selected for the preamble puncturing. For example, a sum of the adjusted values in each line is calculated to be the score of each line.

Figure 4B:
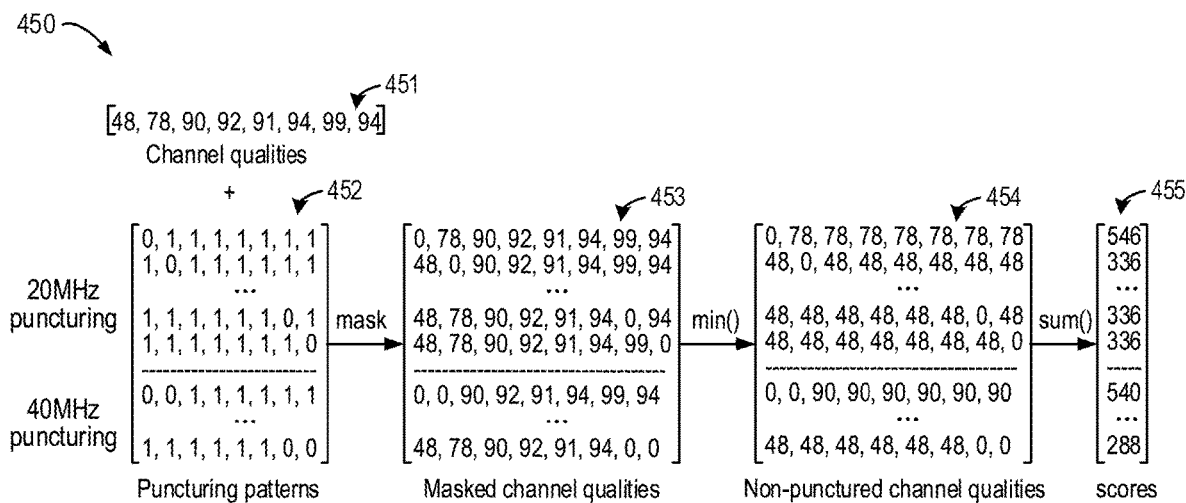

FIG. 4B illustrates a non-OFDMA case 450 for selecting a puncturing pattern according to embodiments of the present disclosure. As shown in FIG. 4B, the channel quality array 451 of 160 MHz channel is obtained based on the above function F, and the channel qualities Q20 in the channel quality array 451 are [48, 78, 90, 92, 91, 94, 99, 94]. Since the bandwidth of the channel is 160 MHz, and 20/40 MHz puncturing patterns are possible puncturing candidates. The puncturing pattern matrix 452 including candidate puncturing patterns is obtained, which includes eight 20 MHz candidate puncturing patterns and four 40 MHz candidate puncturing patterns.

Continue to refer to FIG. 4B, the related element for each candidate puncturing pattern in the puncturing pattern matrix 452 is masked to generate a masked channel quality matrix 453 including the masked channel qualities. Then, a minimum algorithm may be used for the masked channel quality matrix 453 to generate a minimum channel quality matrix 454 including non-punctured channel qualities. For SU transmission, the channel quality is limited by the worst channel. For example, [0, 78, 90, 92, 91, 94, 99, 94] is the first line in the masked channel quality matrix 453, and the first 20 MHz sub-channel is masked off, then the minimum value is determined to be 78, and thus a new array [0, 78, 78, 78, 78, 78, 78, 78] is obtained.

The sore matrix 455 is calculated based on the minimum channel quality matrix 454. For example, a sum of elements in array [0, 78, 78, 78, 78, 78, 78, 78] is calculated to be 546, which is treated as the final score for the candidate puncturing pattern [0, 1, 1, 1, 1, 1, 1, 1]. Then, the highest score 546 is picked from the sore matrix 455, and the candidate puncturing pattern [0, 1, 1, 1, 1, 1, 1, 1] is selected as the final puncturing pattern, which means masking off the first 20 MHz sub-channel band. In this way, the process 400 of the present disclosure can select a proper puncturing pattern for the preamble puncturing.

Figure 5A:
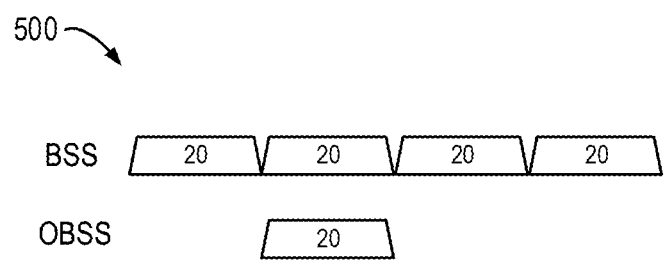
FIGS. 5A-5B illustrate an example for preamble puncturing for 80 MHz bandwidth according to embodiments of the present disclosure.
Figure 5B:
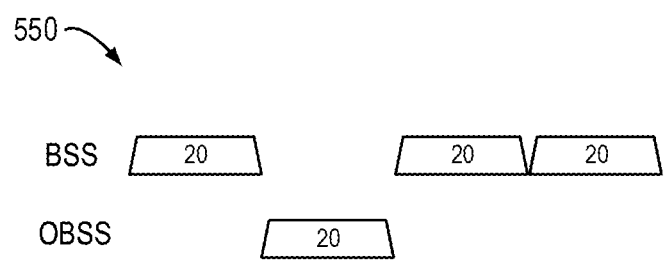

FIGS. 5A-5B illustrate an example for preamble puncturing for 80 MHz bandwidth according to embodiments of the present disclosure. In the scenario 500 of FIG. 5A, BSS of the AP operates on channel 36E at 80 MHz, and OBSS of the neighbor AP operates on the channel 40 at 20 MHz. Because BSS has 80 MHz working channel bandwidth, AP has four 20 MHz puncturing patterns as shown in FIG. 2A, i.e., [0, 1, 1, 1], [1, 0, 1, 1], [1, 1, 0, 1], [1, 1, 1, 0], and the minimum sub-channel bandwidth is 20 MHz.

For example, assume that $Q20_{(AP, 36E)}$ is [84, 47, 94, 92], which means the first 20 MHz sub-channel quality $Q20_0$ is 84, the second 20 MHz sub-channel quality $Q20_1$ is 47, the third 20 MHz sub-channel quality $Q20_2$ is 94, and the fourth 20 MHz sub-channel quality $Q20_3$ is 92. The second 20 MHz sub-channel is worst sub-channel in the 80 MHz channel of BSS. According to the above process 400, the score for puncturing patterns [0, 1, 1, 1], [1, 1, 0, 1], [1, 1, 1, 0] is calculated to be 141, and the score for puncturing pattern [1, 0, 1, 1] is calculated to be 252. Thus, the puncturing pattern with the highest score is [1, 0, 1, 1], and the puncturing pattern [1, 0, 1, 1] is selected for the 80 MHz channel of BSS, as indicated by the scenario 550 of FIG. 5B.

Figure 6A:
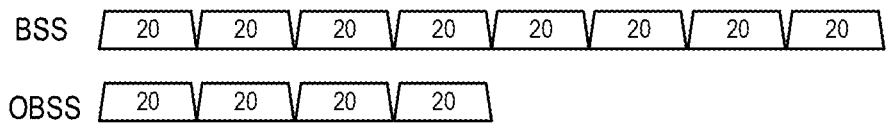
FIGS. 6A-6B illustrate another example for preamble puncturing for 160 MHz bandwidth according to embodiments of the present disclosure.
Figure 6B:
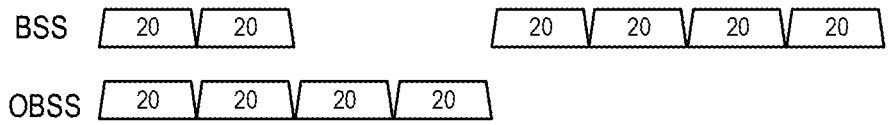

FIGS. 6A-6B illustrate another example for preamble puncturing for 160 MHz bandwidth according to embodiments of the present disclosure. In the scenario 600 of FIG. 6A, BSS of the AP operates on channel 100S at 160 MHz, and OBSS of the neighbor AP operates on the channel 100E at 80 MHz. Because BSS has 160 MHz working channel bandwidth, AP has eight 20 MHz puncturing patterns and four 40 MHz puncturing patterns as below and as shown in FIG. 2B, and the minimum sub-channel bandwidth is 20 MHz.

[0, 1, 1, 1, 1, 1, 1, 1], [1, 0, 1, 1, 1, 1, 1, 1], [1, 1, 0, 1, 1, 1, 1, 1], [1, 1, 1, 0, 1, 1, 1, 1], [1, 1, 1, 1, 0, 1, 1, 1], [1, 1, 1, 1, 1, 0, 1, 1], [1, 1, 1, 1, 1, 1, 0, 1], [1, 1, 1, 1, 1, 1, 1, 0], [0, 0, 1, 1, 1, 1, 1, 1], [1, 1, 0, 0, 1, 1, 1, 1], [1, 1, 1, 1, 0, 0, 1, 1], [1, 1, 1, 1, 1, 1, 0, 0].

In the case of 160 MHz bandwidth, 20 MHz and 40 MHz sub-channels are scanned, and 20 MHz quality Q20 and 40 MHz quality Q40 are obtained. For example, assume that $Q20_{(AP, 100S)}$ is [56, 62, 37, 43, 86, 92, 86, 88], which means the first 20 MHz sub-channel quality $Q20_0$ is 56, the second 20 MHz sub-channel quality $Q20_1$ is 62, ..., and the seventh 20 MHz sub-channel quality $Q20_7$ is 88. Assume that $Q40_{(AP, 100S)}$ is [59, 40, 89, 87], which means the first 40 MHz sub-channel quality $Q40_0$ is 59, the second 40 MHz sub-channel quality $Q40_1$ is 40, ..., and the fourth 40 MHz sub-channel quality $Q40_3$ is 87.

According to the above process 400, the score for puncturing pattern [1, 1, 0, 0, 1, 1, 1, 1] is calculated to be highest score of 354 among all the puncturing patterns. Thus, the puncturing pattern [1, 1, 0, 0, 1, 1, 1, 1] is selected for the 160 MHz channel of BSS, as indicated by the scenario 650 of FIG. 6B.

Figure 7:
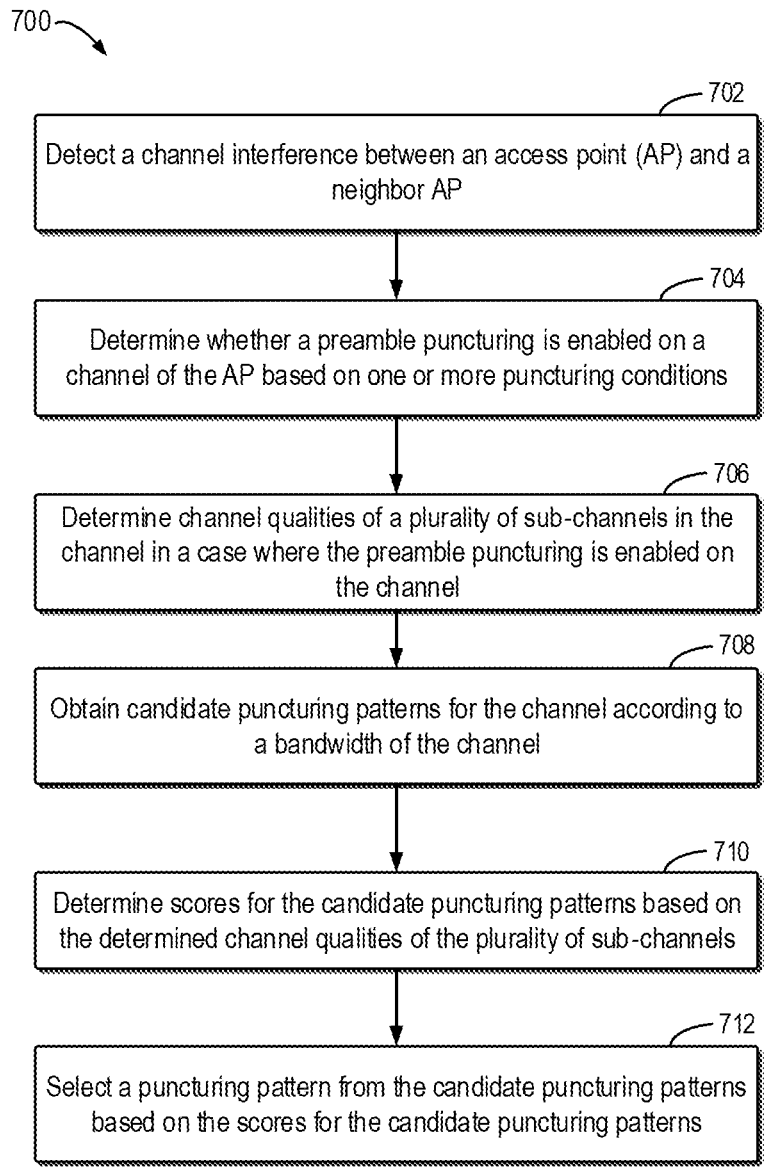
FIG. 7 illustrates a flow chart of an example method for selecting a puncturing pattern based on channel qualities according to embodiments of the present disclosure.

FIG. 7 illustrates a flow chart of an example method 700 for selecting a puncturing pattern based on channel qualities according to embodiments of the present disclosure. At 702, an AP detects channel interference between the AP and its neighbor AP. At 704, the AP determines whether a preamble puncturing is enabled on a channel of the AP based on one or more puncturing conditions. At 706, the AP determines channel qualities of a plurality of sub-channels in the channel when the preamble puncturing needs to be enabled on the channel. At 708, the AP obtains candidate puncturing patterns for the channel according to a bandwidth of the channel. At 710, the AP determines scores for the candidate puncturing patterns based on the determined channel qualities of the plurality of sub-channels. At 712, the AP selects a puncturing pattern from the candidate puncturing patterns based on the scores for the candidate puncturing patterns. In this way, a proper puncturing pattern can be selected based on the respective quality scores, and thus the method 700 can help AP to achieve an effective and better puncturing scheme in real deployment.

In some embodiments, wherein the determining at 704 may comprise obtaining a received signal strength indication (RSSI) of a packet from the neighbor AP, and determining whether a preamble puncturing is enabled on the channel based on the obtained RSSI.

In some embodiments, wherein the determining at 704 may comprise obtaining a first basic service set (BSS) color of the AP and a second BSS color of the neighbor AP, and determining whether the first BSS color is the same as the second BSS color. If the first BSS color is the same as the second BSS color, the AP compares the RSSI with a first threshold such as an intra-BSS threshold. If the first BSS color is different with the second BSS color, the AP compares the RSSI with a second threshold such as an inter-BSS threshold.

In some embodiments, if the RSSI is less than a first threshold, the AP determines that the preamble puncturing needs to be disabled on the channel. If the RSSI is greater than a first threshold, the AP obtains channel parameters associated with the channel. The channel parameters may comprise two or more of a channel utilization, a noise floor value, a retry flag or a physical error. Then, the AP may evaluate whether a preamble puncturing is enabled on the channel based on the obtained channel parameters.

In some embodiments, wherein the determining at 704 may comprise determining whether a critical service runs on the neighbor AP, and determining that the preamble puncturing is enabled on the channel when a critical service runs on the neighbor AP.

In some embodiments, wherein the determining at 704 may comprise determining a percentage of clients that do not support the preamble puncturing, and determining that the preamble puncturing is disabled on the channel when the percentage is greater than a predetermined threshold.

In some embodiments, the determining at 706 may comprise determining the channel qualities of the plurality of sub-channels based on channel parameters associated with the channel. The channel parameters may comprise two or more of a channel utilization, physical errors, a number of puncture supported wireless devices, a number of non-puncture supported wireless devices, and traffic amount.

In some embodiments, the obtaining at 708 may comprise generating a puncturing pattern matrix including the candidate puncturing patterns if orthogonal frequency-division multiple access (OFDMA) is not utilized in the channel.

In some embodiments, the determining at 710 may comprise generating a masked channel quality matrix based on the channel qualities and the puncturing pattern matrix, adjusting the masked channel quality matrix using a minimum function to generate a minimum channel quality matrix, and determining scores for the candidate puncturing patterns based on the minimum channel quality matrix.

In some embodiments, the obtaining at 708 may comprise splitting the channel into one or more units with a predetermined size when OFDMA is utilized in the channel, and obtaining candidate puncturing patterns for each of the one or more units.

Figure 8:
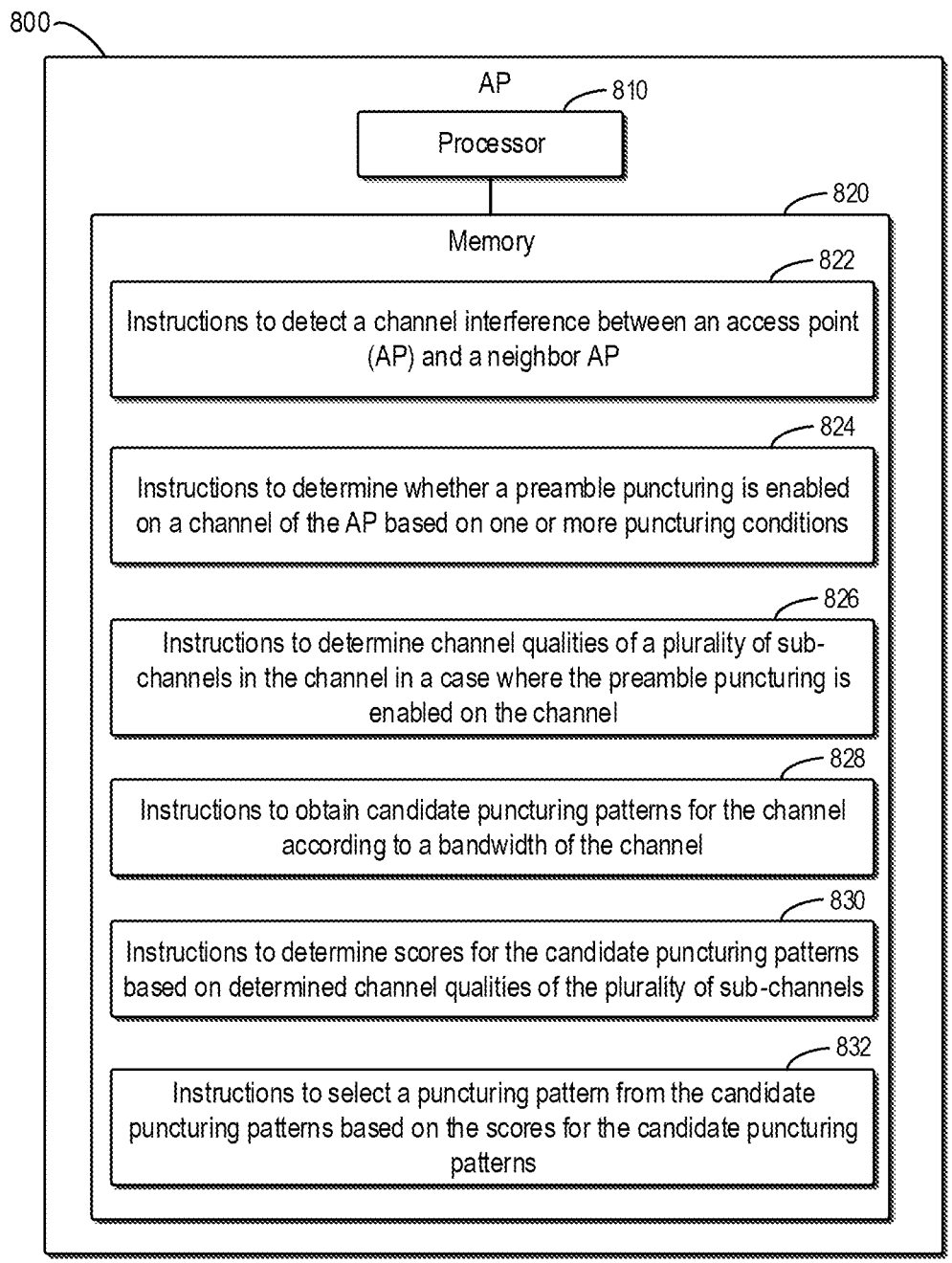
FIG. 8 illustrates an example AP according to embodiments of the present disclosure.

FIG. 8 illustrates an example AP 800 according to embodiments of the present disclosure. As shown in FIG. 8, the AP 800 comprises at least one processor 810 and a memory 820 coupled to the processor 810. The memory 820 stores instructions 822, 824, 826, 828, 830 and 832 to cause the processor 810 to perform actions according to embodiments of the present disclosure.

As shown in FIG. 8, the memory 820 stores instructions 822 to detect a channel interference between the AP and a neighbor AP, and stores instructions 824 to determine whether a preamble puncturing is enabled on a channel of the AP based on one or more puncturing conditions. As shown in FIG. 8, the memory 820 further stores instructions 826 to determine channel qualities of a plurality of sub-channels in the channel when the preamble puncturing is enabled on the channel, and stores instructions 828 to obtain candidate puncturing patterns for the channel according to a bandwidth of the channel. As shown in FIG. 8, the memory 820 further stores instructions 830 to determine scores for the candidate puncturing patterns based on the determined channel qualities of the plurality of sub-channels, and stores instructions 832 to select a puncturing pattern from the candidate puncturing patterns based on the scores for the candidate puncturing patterns.

In some embodiments, wherein the instructions 824 to determine whether a preamble puncturing is enabled on the channel comprise instructions to cause the at least one processor to: obtain a received signal strength indication (RSSI) of a packet from the neighbor AP, and determine whether a preamble puncturing is enabled on the channel based on the obtained RSSI.

In some embodiments, wherein the instructions 824 to determine whether a preamble puncturing is enabled on the channel based on the obtained RSSI comprise instructions to cause the at least one processor to: obtain a first basic service set (BSS) color of the AP and a second BSS color of the neighbor AP, determine whether the first BSS color is the same as the second BSS color. The instructions 824 to determine whether a preamble puncturing is enabled on the channel based on the obtained RSSI comprise instructions to cause the at least one processor to: in accordance with a determination that the first BSS color is the same as the second BSS color, compare the RSSI with a first threshold, and in accordance with a determination that the first BSS color is different with the second BSS color, compare the RSSI with a second threshold.

In some embodiments, wherein the instructions to compare the RSSI with a first threshold comprise instructions to cause the at least one processor to: in accordance with a determination that the RSSI is less than a first threshold, determine that the preamble puncturing is disabled on the channel, in accordance with a determination that the RSSI is greater than a first threshold, obtain channel parameters associated with the channel, and evaluate whether a preamble puncturing is enabled on the channel based on the obtained channel parameters. The channel parameters may comprise one or more of channel utilization, a noise floor value, a retry flag or a physical error.

In some embodiments, wherein the instructions 824 to determine whether a preamble puncturing is enabled on the channel comprise instructions to cause the at least one processor to: determine whether a critical service runs on the neighbor AP, and in accordance with a determination that a critical service runs on the neighbor AP, determine that the preamble puncturing is enabled on the channel.

In some embodiments, wherein the instructions 824 to determine whether a preamble puncturing is enabled on the channel comprise instructions to cause the at least one processor to: determine a percentage of clients that do not support the preamble puncturing, and in accordance with a determination that the percentage is greater than a predetermined threshold, determine that the preamble puncturing is disabled on the channel.

In some embodiments, wherein the instructions 826 to determine channel qualities of a plurality of sub-channels in the channel comprise instructions to cause the at least one processor to determine the channel qualities of the plurality of sub-channels based on channel parameters associated with the channel. The channel parameters may comprise two or more of a channel utilization, physical errors, a number of puncture supported wireless devices, a number of non-puncture supported wireless devices, and traffic amount.

In some embodiments, wherein the instructions 828 to obtain candidate puncturing patterns for the channel according to a bandwidth of the channel comprise instructions to cause the at least one processor to in accordance with a determination that orthogonal frequency-division multiple access (OFDMA) is not utilized in the channel, generate a puncturing pattern matrix including the candidate puncturing patterns.

In some embodiments, wherein the instructions 830 to determine scores for the candidate puncturing patterns comprise instructions to cause the at least one processor to: generate a masked channel quality matrix based on the channel qualities and the puncturing pattern matrix, adjust the masked channel quality matrix using a minimum function to generate a minimum channel quality matrix, and determine scores for the candidate puncturing patterns based on the minimum channel quality matrix.

In some embodiments, the instructions 828 to obtain candidate puncturing patterns for the channel according to a bandwidth of the channel comprise instructions to cause the at least one processor to: split the channel into one or more units with a predetermined size when OFDMA is utilized in the channel, and obtain candidate puncturing patterns for each of the one or more units.

In some embodiments, there is disclosure a non-transitory computer-readable medium. The non-transitory computer-readable medium comprise instructions stored thereon, when executed by an access point (AP), cause the AP to: detect a channel interference between the AP and a neighbor AP, determine whether a preamble puncturing is enabled on a channel of the AP based on one or more puncturing conditions, in accordance with a determination that the preamble puncturing is enabled on the channel, determine channel qualities of a plurality of sub-channels in the channel. The instructions further cause the AP to: obtain candidate puncturing patterns for the channel according to a bandwidth of the channel, determine scores for the candidate puncturing patterns based on the determined channel qualities of the plurality of sub-channels, and select a puncturing pattern from the candidate puncturing patterns based on the scores for the candidate puncturing patterns.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:
   detecting a channel interference between an access point (AP) and a neighbor AP;
   determining whether a preamble puncturing is enabled on a channel of the AP based on one or more puncturing conditions;
   in accordance with a determination that the preamble puncturing is enabled on the channel, determining channel qualities of a plurality of sub-channels in the channel;
   obtaining candidate puncturing patterns for the channel according to a bandwidth of the channel;
   determining scores for the candidate puncturing patterns based on the determined channel qualities of the plurality of sub-channels; and
   selecting a puncturing pattern from the candidate puncturing patterns based on the scores for the candidate puncturing patterns.

2. The method according to claim 1, wherein determining whether a preamble puncturing is enabled on the channel comprises:
   obtaining a received signal strength indication (RSSI) of a packet from the neighbor AP; and
   determining whether a preamble puncturing is enabled on the channel based on the obtained RSSI.

3. The method according to claim 1, wherein determining whether a preamble puncturing is enabled on the channel based on the obtained RSSI comprises:
   obtaining a first basic service set (BSS) color of the AP and a second BSS color of the neighbor AP;
   determining whether the first BSS color is the same as the second BSS color;
   in accordance with a determination that the first BSS color is the same as the second BSS color, comparing the RSSI with a first threshold; and in accordance with a determination that the first BSS color is different with the second BSS color, comparing the RSSI with a second threshold.

4. The method according to claim 3, wherein comparing the RSSI with a first threshold comprises:
in accordance with a determination that the RSSI is less than a first threshold, determining that the preamble puncturing is disabled on the channel;
in accordance with a determination that the RSSI is greater than a first threshold, obtaining channel parameters associated with the channel, wherein the channel parameters comprise two or more of a channel utilization, a noise floor value, a retry flag or a physical error; and
evaluating whether a preamble puncturing is enabled on the channel based on the obtained channel parameters.

5. The method according to claim 1, wherein determining whether a preamble puncturing is enabled on the channel comprises:
determining whether a critical service runs on the neighbor AP; and
in accordance with a determination that a critical service runs on the neighbor AP, determining that the preamble puncturing is enabled on the channel.

6. The method according to claim 1, wherein determining whether a preamble puncturing is enabled on the channel comprises:
determining a percentage of clients that do not support the preamble puncturing; and
in accordance with a determination that the percentage is greater than a predetermined threshold, determining that the preamble puncturing is disabled on the channel.

7. The method according to claim 1, wherein determining channel qualities of a plurality of sub-channels in the channel comprises:
determining the channel qualities of the plurality of sub-channels based on channel parameters associated with the channel, wherein the channel parameters comprise two or more of a channel utilization, physical errors, a number of puncture supported wireless devices, a number of non-puncture supported wireless devices, and traffic amount.

8. The method according to claim 1, wherein obtaining candidate puncturing patterns for the channel according to a bandwidth of the channel comprises:
in accordance with a determination that orthogonal frequency-division multiple access (OFDMA) is not utilized in the channel, generating a puncturing pattern matrix including the candidate puncturing patterns.

9. The method according to claim 8, wherein determining scores for the candidate puncturing patterns comprises:
generating a masked channel quality matrix based on the channel qualities and the puncturing pattern matrix;
adjusting the masked channel quality matrix using a minimum function to generate a minimum channel quality matrix; and
determining scores for the candidate puncturing patterns based on the minimum channel quality matrix.

10. The method according to claim 8, wherein obtaining candidate puncturing patterns for the channel according to a bandwidth of the channel comprises:
in accordance with a determination that OFDMA is utilized in the channel, splitting the channel into one or more units with a predetermined size; and
obtaining candidate puncturing patterns for each of the one or more units.

11. An access point (AP) comprising:
at least one processor; and
a memory coupled to the at least one processor, the memory storing instructions to cause the at least one processor to:
detect a channel interference between the AP and a neighbor AP;
determine whether a preamble puncturing is enabled on a channel of the AP based on one or more puncturing conditions;
in accordance with a determination that the preamble puncturing is enabled on the channel, determine channel qualities of a plurality of sub-channels in the channel;
obtain candidate puncturing patterns for the channel according to a bandwidth of the channel;
determine scores for the candidate puncturing patterns based on the determined channel qualities of the plurality of sub-channels; and
select a puncturing pattern from the candidate puncturing patterns based on the scores for the candidate puncturing patterns.

12. The AP according to claim 11, wherein the instructions to determine whether a preamble puncturing is enabled on the channel comprise instructions to cause the at least one processor to:
obtain a received signal strength indication (RSSI) of a packet from the neighbor AP; and
determine whether a preamble puncturing is enabled on the channel based on the obtained RSSI.

13. The AP according to claim 11, wherein the instructions to determine whether a preamble puncturing is enabled on the channel based on the obtained RSSI comprise instructions to cause the at least one processor to:
obtain a first basic service set (BSS) color of the AP and a second BSS color of the neighbor AP;
determine whether the first BSS color is the same as the second BSS color;
in accordance with a determination that the first BSS color is the same as the second BSS color, compare the RSSI with a first threshold; and
in accordance with a determination that the first BSS color is different with the second BSS color, compare the RSSI with a second threshold.

14. The AP according to claim 13, wherein the instructions to compare the RSSI with a first threshold comprise instructions to cause the at least one processor to:
in accordance with a determination that the RSSI is less than a first threshold, determine that the preamble puncturing is disabled on the channel;
in accordance with a determination that the RSSI is greater than a first threshold, obtain channel parameters associated with the channel, wherein the channel parameters comprise two or more of a channel utilization, a noise floor value, a retry flag or a physical error; and
evaluate whether a preamble puncturing is enabled on the channel based on the obtained channel parameters.

15. The AP according to claim 11, wherein the instructions to determine whether a preamble puncturing is enabled on the channel comprise instructions to cause the at least one processor to:
determine whether a critical service runs on the neighbor AP; and
in accordance with a determination that a critical service runs on the neighbor AP, determine that the preamble puncturing is enabled on the channel.

16. The AP according to claim 11, wherein the instructions to determine whether a preamble puncturing is enabled on the channel comprise instructions to cause the at least one processor to:
  determine a percentage of clients that do not support the preamble puncturing; and
  in accordance with a determination that the percentage is greater than a predetermined threshold, determine that the preamble puncturing is disabled on the channel.

17. The AP according to claim 11, wherein the instructions to determine channel qualities of a plurality of sub-channels in the channel comprise instructions to cause the at least one processor to:
  determine the channel qualities of the plurality of sub-channels based on channel parameters associated with the channel, wherein the channel parameters comprise two or more of a channel utilization, physical errors, a number of puncture supported wireless devices, a number of non-puncture supported wireless devices, and traffic amount.

18. The AP according to claim 11, wherein the instructions to obtain candidate puncturing patterns for the channel according to a bandwidth of the channel comprise instructions to cause the at least one processor to:
  in accordance with a determination that orthogonal frequency-division multiple access (OFDMA) is not utilized in the channel, generate a puncturing pattern matrix including the candidate puncturing patterns.

19. The AP according to claim 18, wherein the instructions to determine scores for the candidate puncturing patterns comprise instructions to cause the at least one processor to:
  generate a masked channel quality matrix based on the channel qualities and the puncturing pattern matrix;
  adjust the masked channel quality matrix using a minimum function to generate a minimum channel quality matrix; and
  determine scores for the candidate puncturing patterns based on the minimum channel quality matrix.

20. A non-transitory computer-readable medium comprising instructions stored thereon which, when executed by an access point (AP), cause the AP to:
  detect a channel interference between the AP and a neighbor AP;
  determine whether a preamble puncturing is enabled on a channel of the AP based on one or more puncturing conditions;
  in accordance with a determination that the preamble puncturing is enabled on the channel, determine channel qualities of a plurality of sub-channels in the channel;
  obtain candidate puncturing patterns for the channel according to a bandwidth of the channel;
  determine scores for the candidate puncturing patterns based on the determined channel qualities of the plurality of sub-channels; and
  select a puncturing pattern from the candidate puncturing patterns based on the scores for the candidate puncturing patterns.

* * * * *